United States Patent [19]

Gottshall

[11] Patent Number: 4,879,644

[45] Date of Patent: Nov. 7, 1989

[54] OBJECT POSITIONING APPARATUS AND METHOD

[75] Inventor: R. Marc Gottshall, Des Moines, Wash.

[73] Assignee: The Boeing Company, Seattle, Wash.

[21] Appl. No.: 139,840

[22] Filed: Dec. 30, 1987

[51] Int. Cl.$^4$ .............................................. G05B 13/00
[52] U.S. Cl. ........................... 364/167.01; 364/474.11; 364/132
[58] Field of Search ................................ 364/131–139, 364/184, 185, 187, 167.01, 474.28, 474.03, 474.11

[56] References Cited

U.S. PATENT DOCUMENTS

| | | | |
|---|---|---|---|
| 4,527,244 | 7/1985 | Graham Jr. et al. | 364/475.12 |
| 4,639,172 | 1/1987 | Kishi et al. | 364/474.03 |
| 4,641,269 | 2/1987 | Japenga et al. | 364/473 |

Primary Examiner—Allen MacDonald
Attorney, Agent, or Firm—Seed and Berry

[57] ABSTRACT

Apparatus and method are provided for automatically controlling the position of one or more objects. The apparatus comprises a position control network which receives macro-type movement commands from a mainframe computer. The network includes a plurality of interface processors each adapted to provide a plurality of micro-commands in response to each macro-command. The micro-commands are supplied to motion controllers which in turn control the movement of servomotors. The servomotors position the object. Position encoders are provided to monitor the position of the objects and provide position data to the interface processor for transmission to the mainframe computer. A novel method is disclosed which employs the foregoing apparatus to provide synchronous motion of two or more objects.

18 Claims, 5 Drawing Sheets

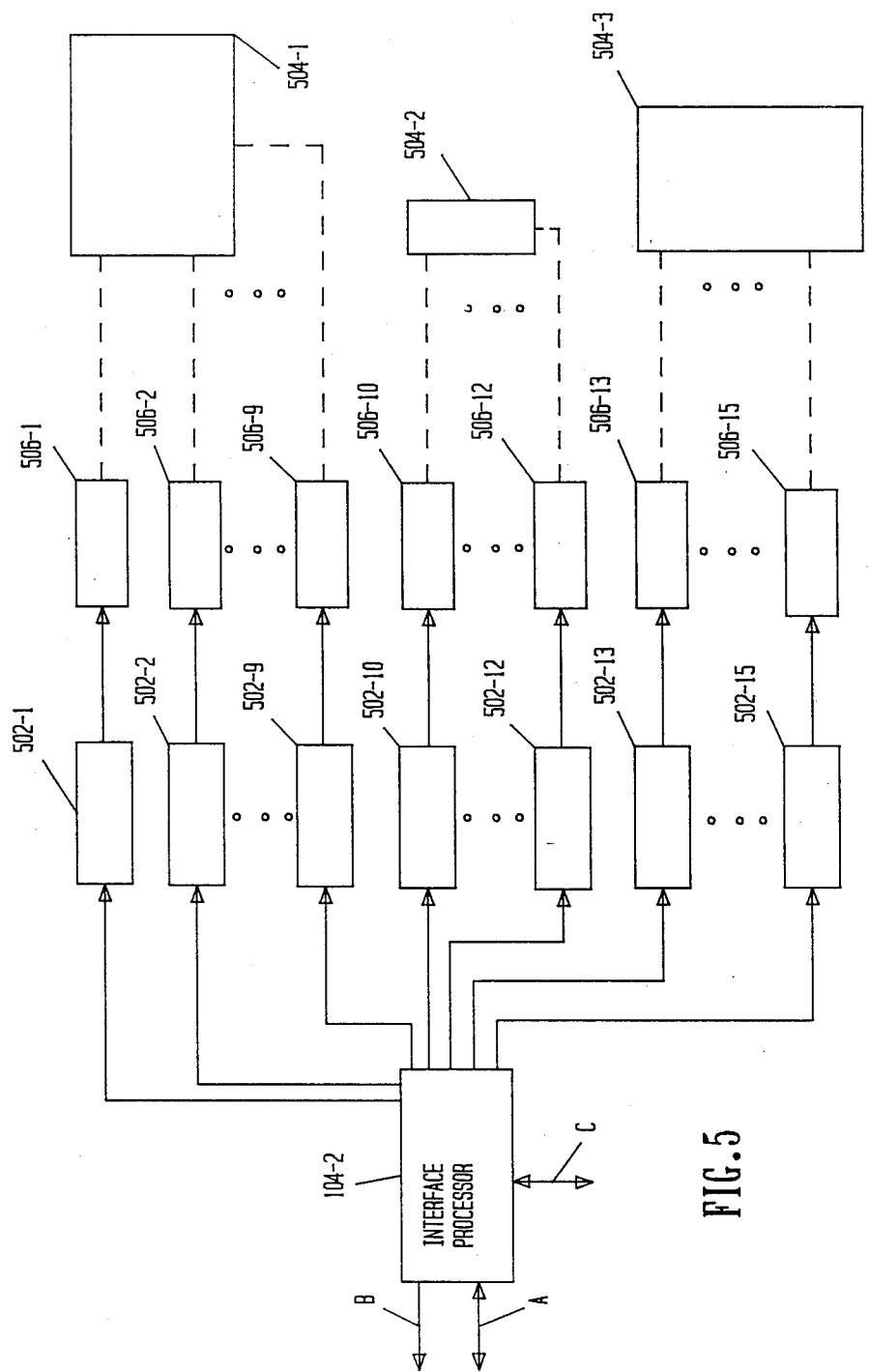

OBJECT POSITIONING APPARATUS AND METHOD

TECHNICAL FIELD

The present invention is directed toward an object positioning apparatus and method and, more particularly, toward an improved network for controlling multiple axes of motion of an object, or objects to be positioned.

BACKGROUND OF THE INVENTION

With increased automation of manufacturing and materials handling systems, automated motion controllers have become more and more desirable. Many such systems have been proposed to control the motion of servomotors which are used to move objects to desired positions. Prior systems have proven inadequate in that they fail to provide accurate yet inexpensive control.

As an example, some previously proposed systems have succeeded in some areas where a specific isolated event is coordinated by a computer, such as operating a single axis of a radar antenna in a continuous motion. However, several events in succession were not possible without coordinating groups of advanced hardware and software systems.

Other previously suggested systems have provided advanced hardware without multi-tasking software. This reduces the advantage of providing the advanced hardware. Still other attempts to control several axes relied upon several single axis controllers which need synchronization by a host computer. Such systems have required the host to provide substantial control thus preventing the host from performing other functions and limiting the number of axis of motion which the host is able to control.

It is desirable, therefore, to provide an object positioning system which is capable of performing a number of simultaneous events. It is further desirable to provide an object positioning system which is capable of optimizing use of advanced hardware. It is further desirable to provide an object positioning system which allows the host computer to perform other tasks while monitoring the status of a plurality of interface processors.

DISCLOSURE OF THE INVENTION

The present invention provides a network for positioning an object or objects. The network includes a mainframe computer for providing macro-commands. An interface processor is coupled to receive the macro-commands from the mainframe computer and to provide a plurality of micro-commands in response to each macro-command. A servomotor is responsive to an applied signal for moving the object. An incremental encoder responds to the movement of the servomotor to provide a feedback signal indicative of the servomotor's motion. A motion controller responds to the micro-commands received from the interface processor to provide the applied signal, the motion controller also responds to the feedback signal provided from the incremental encoder to vary the magnitude of the applied signal. A position encoder is provided for providing position data indicative of the position of the object. The position encoder is coupled to supply the position data to the interface processor. The interface processor is adapted to process the position data and supply the raw or processed position data to the mainframe computer.

A method for synchronous positioning of first and second objects is also disclosed. The first and second objects are each moved by a plurality of servomotors. The method includes the steps of providing a first plurality of micro-commands to the motion controller associated with the servomotors which position the first object. The positions of the first and second objects are monitored by the interface processor to provide an error signal indicative of the difference in position between the first and second objects. A second plurality of micro-commands is provided to the motion controller associated with the servomotors which position the second object, the second plurality of microcommands being provided in response to the error signal such that the error signal is minimized and the first and second objects undergo substantially synchronous motion.

BRIEF DESCRIPTION OF THE DRAWINGS

FIG. 5 is an illustration of an alternate arrangement of the motion controller illustrated in FIG. 1.

DETAILED DESCRIPTION

Figure 1:
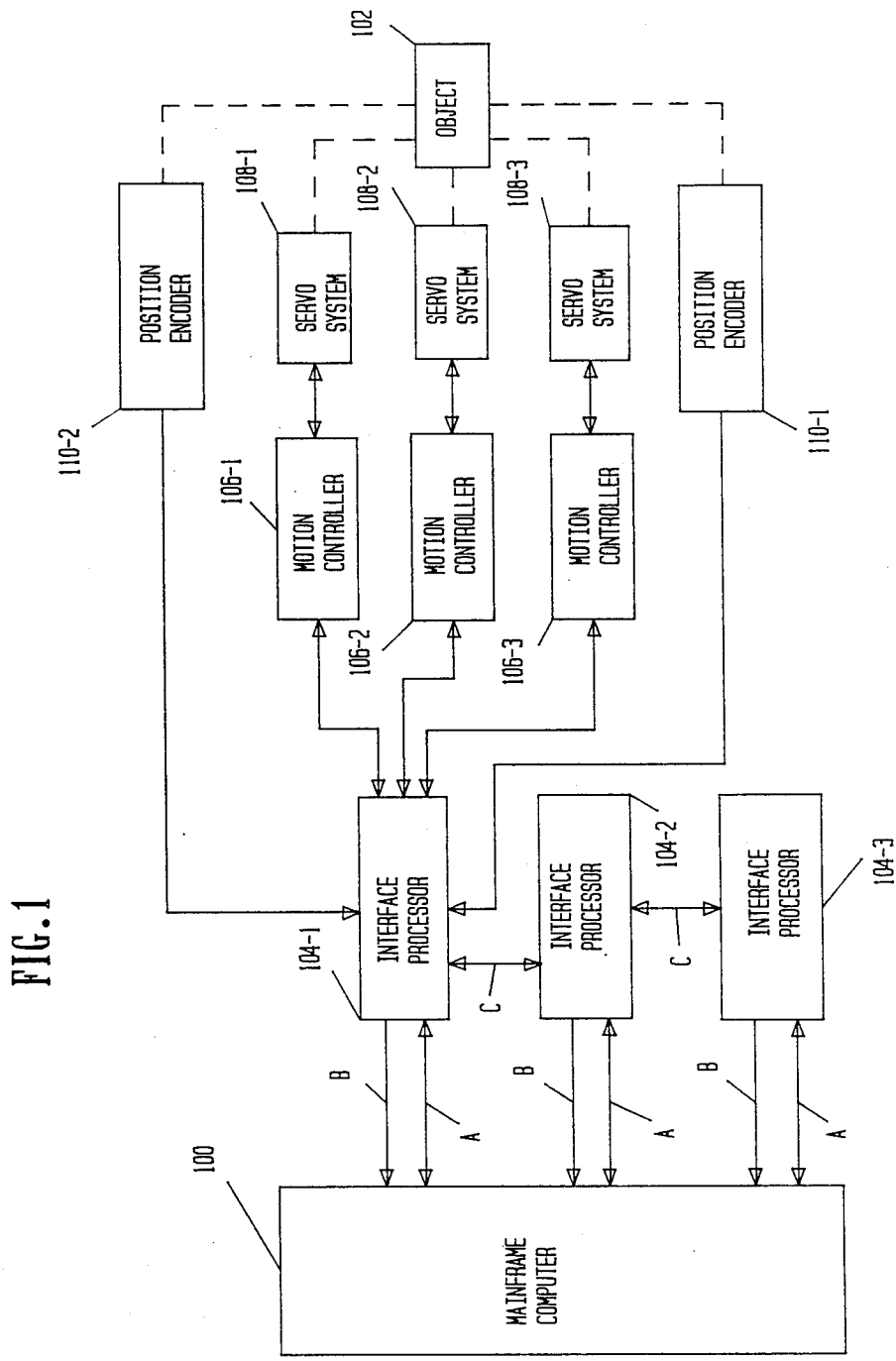
FIG. 1 is an illustrative block diagram of the motion control network which is the subject of the present invention.

A network for positioning an object is shown generally in FIG. 1. The object positioning network includes a mainframe computer 100 which is programmed to provide global control of the motion of an object 102. The mainframe computer provides global control by providing macro-commands to a plurality of interface processors 104-1 through 104-3, each associated with a respective object (in FIG. 1, however, only the object which is moved by interface controller 104-1 is shown).

Each interface processor 104-1 through 104-3 is adapted to respond to the macro-commands received from the mainframe computer to provide a plurality of micro-commands to a plurality of respective motion controllers. As shown in FIG. 1, interface processor 104-1 provides its microcommands to motion controllers 106-1 through 106-3. Each motion controller in turn applies a signal to a respective servosystem 108-1 through 108-3. The servosystems respond to the applied signal to move the object 102 in a particular direction.

Each servosystem of the plurality of servosystems 108-1 through 108-3 is provided for controlling a particular axis of motion of the object 102. As an example, the servosystem 108-1 may control the pitch of object 102, servosystem 108-2 may control the yaw of object 102 and servosystem 108-3 may control the roll of object 102. Additional servosystems may be provided for controlling additional axes of motion. Although the network as illustrated in FIG. 1 provides a separate motion controller 106 for each servosystem 108, it will be appreciated by those skilled in the art that a single motion controller may control one or more servosystems.

The motion control network also includes position encoders 110-1 and 110-2 for monitoring the position of the object 102 and providing position data indicative of the object's position to the interface processor 104-1.

The interface processor may be programmed to process the position data to provide additional micro-commands for further controlling the position of the object 102. Alternatively, the interface processor 104 may transmit the position data to the mainframe computer 100. Transmission of the position data to the mainframe computer may be provided as the data is received by the interface processor or may be provided in a batch mode in response to a poll from the mainframe computer. Further, the interface processor 104 may process data, i.e., decode, encode or other processing, before transmission to the mainframe computer. The manner in which data is transferred to the mainframe computer depends on the instructions provided to the interface processor by the mainframe computer as will be discussed more fully below.

The position encoder 110 may comprise any transducer for providing an electrical signal which is indicative of the movement of the object 102. Preferably, the position encoder 110 will also comprise apparatus for encoding the electrical signal to a digital data signal which represents the angular or linear velocity acceleration or position of the object. Many devices are commercially available which could be used for the position encoder 110. As illustrative examples, although by no means a complete listing, the position encoder 110 may comprise resolvers, synchro transducers, absolute optical encoders or incremental optical encoders.

It will be appreciated by those skilled in the art that while only two position encoders 110 are shown in FIG. 1, a plurality of position encoders may be provided to supply position data to the interface processor 104-1. Several position encoders may be provided for monitoring the motion of a single object where each position encoder is provided for monitoring a particular axis of motion of the object. Further, several position encoders may be provided for monitoring the motion of several axes of motion related to one or more objects which are being positioned.

The macro-commands provided by the mainframe computer 100 are general, global-type move commands. As an example, assume that the object 102 is a tracking radar antenna, the mainframe computer may provide a track macrocommand to the interface processor 104-1, which track macro-command will instruct the interface processor 104-1 to provide a plurality of micro-commands to motion controllers 106-1 through 106-3. Which micro-commands are provided in response to the macro-commands will depend upon the programming of the particular interface processor. For example, the interface processor 104-1 may be programmed to respond to a particular macro-command by issuing a first micro-command and awaiting a position signal from position encoder 110-1. This position signal may be processed, with or without other data, to provide additional micro-commands to be supplied to the motion controllers. Alternatively, the position signal may be reformatted, decoded and/or encoded for transmission to the mainframe computer.

After receiving each micro-command from the interface processor, each of the plurality of motion controllers 106-1 through 106-3 will apply signals to respective servosystems 108-1 through 108-3 to move the antenna in a manner to track an object. In this particular example, the interface processor will monitor the position data received from the position encoder 110. The interface processor will process the position data, in conjunction with data related to the position of the object being tracked, to provide new micro-commands to further position the antenna such that it tracks the motion of the object being tracked.

Alternatively, if the object 102 is a transmitting antenna, the mainframe computer 100 may provide a macro-command to instruct the antenna to transmit in a specific direction. The interface processor 104-1 will respond to this macro-command to provide a plurality of micro-commands to motion controllers 106-1 through 106-3, which micro-commands will instruct the controllers to move the servosystems 108-1 through 108-3 such that the antenna is properly positioned for transmitting in the specified direction. The micro commands provided from the interface processor 104-1 may include enough information to position the antenna at particular angles to the horizon in a particular direction for transmission within a particular time period.

Although the interface processor 104-1 is shown as controlling the position of only a single object, it will be appreciated by those skilled in the art that each interface processor may be adapted to control the position of several objects. Conversely, several interface processors may be required to control the motion of a single object. The interface processors 104 are each adapted to control a predetermined number of axes of motion (15 in the presently preferred embodiment). Whether an interface processor can control the positioning of more than one object is thereby determined by the number of axes which must be controlled to control the positioning of a single object.

As illustrated in FIG. 5, one interface processor 104-2 is couplable to a mainframe computer via its A and B channels and is couplable to another interface processor via its C channel as illustrated in FIG. 1. The interface processor 104-2 is also coupled to a plurality of motion controllers 502-1 through 502-15 for controlling the motion of 3 objects 504-1 through 504-3 via a plurality of servosystems 506-1 through 506-15. In the arrangement of FIG. 5, the interface processor 104-2 controls 9 axes of motion of the first object 504-1 via 9 motion controllers 502-1 through 502-9 and 9 servosystems 506-1 through 506-9. The interface processor 104-2 also controls 3 axes of motion of the second and third objects 504-2 and 504-4 through motion controllers 502-10 through 502-15 and servosystems 506-10 through 506-15. Many other arrangements for controlling one or more objects are possible using the interface processors, motion controllers and servosystems of the present invention.

Referring again to FIGS. 1, the interface processors 104-1 through 104-3 each include two channels, channels A and B in FIG. 1, for transmitting and receiving information to and from the mainframe computer 100. A first channel A is provided for transmitting and receiving control information between the interface processor 104 and mainframe computer 100. A second channel B is provided for transmitting position data to the mainframe from the interface processor 104. The interface processors 104-1 through 104-3 are programmed either to transmit position data as it is received; to store the position data as it is received and to transmit all stored position data at regular intervals; or to store the position data as it is received and to transmit the position data when polled by the mainframe computer.

Separation of the control data from the position data allows for faster transfer of the position data when necessary, as for example when the positioning network is positioning a tracking antenna. In such a network, the interface processor which is positioning the tracking antenna may be assigned a first priority by the mainframe computer such that position data related to the position of the antenna is transferred as received. If the interface processor is controlling the movement of other objects, as for example, a transmission receiving antenna, then the interface processor may be instructed by the mainframe computer to transmit position data related to the transmission receiving antenna only after being polled by the mainframe computer.

The interface processor 104 also includes a third channel C for transmitting and receiving information to other interface processors. The third channel C further enhances the ability of the interface processors to execute global move commands received from the mainframe computer. Using the third channel C, the interface processor 104-1 may receive position or other data from the interface processor 104-2 such that the received data may be processed to provide additional micro-commands to motion controllers 106.

Figure 2:
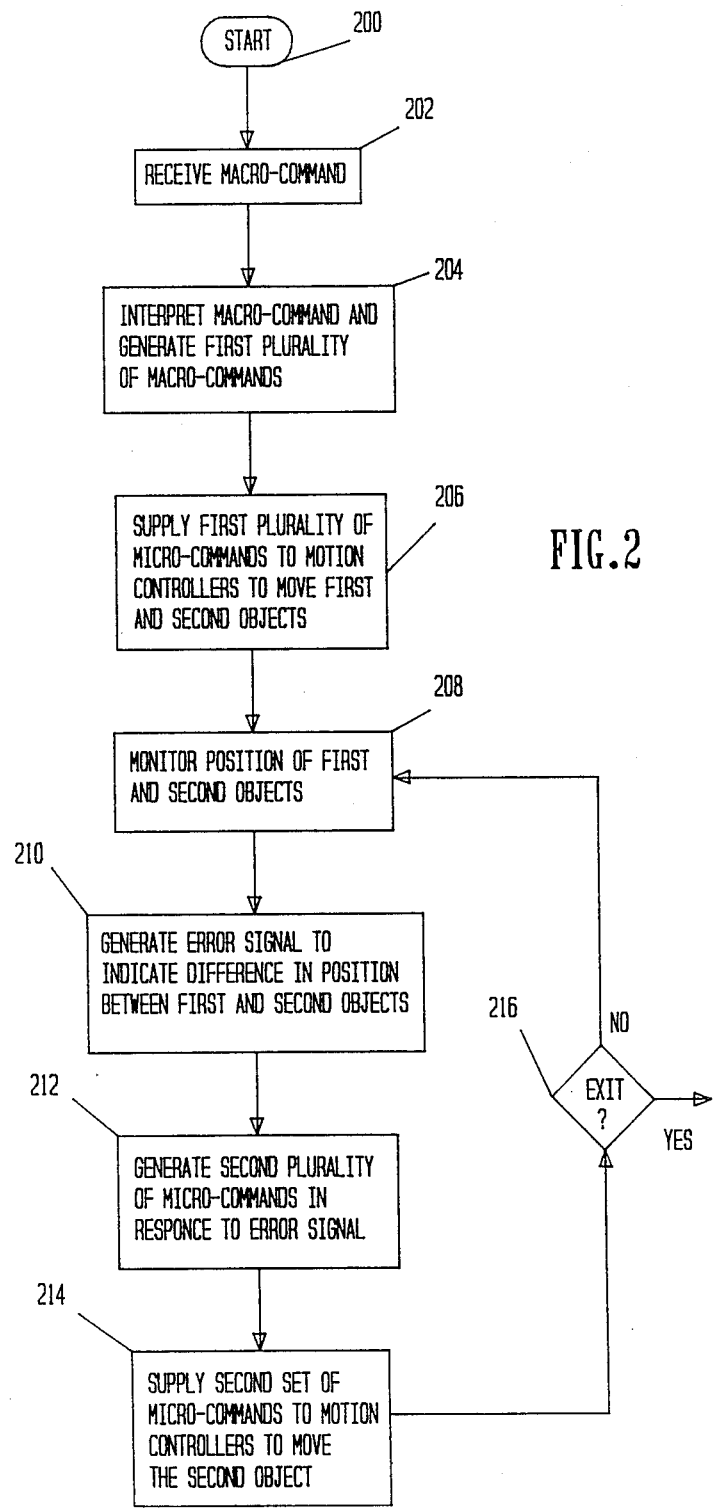
FIG. 2 is a decision flow diagram of the method which comprises the subject invention.

The interface processors 104 are further adapted to implement a method for synchronizing the motion of two or more objects. A general flow diagram illustrating the method is provided in FIG. 2. After the network is initialized in step 200, a macro-command is received which contains information of the desired movement of the first and second objects, step 202. A plurality of first microcommands are provided from the macro-command, step 204, and are supplied to the motion controllers which move the first object, step 206. The position of the first and second objects is monitored by the interface processor via one or more position encoders 110, step 208. An error signal is generated which indicates the difference in position between the first and second objects, step 210. The error signal is used to generate a second plurality of microcommands which are supplied to the motion controllers which move the second object, steps 212 and 214.

After completing step 214, the interface processor determines whether to exit the routine, step 216. It may be desirable to temporarily exit the routine to perform other functions, i.e., servicing interrupts, data processing, previously micro-commands to other motion controllers, etc. After performing the other function or if no exit is desired, the interface processor returns to step 208 to continue monitoring the position of the first and second objects and provide error singals.

Figure 3:
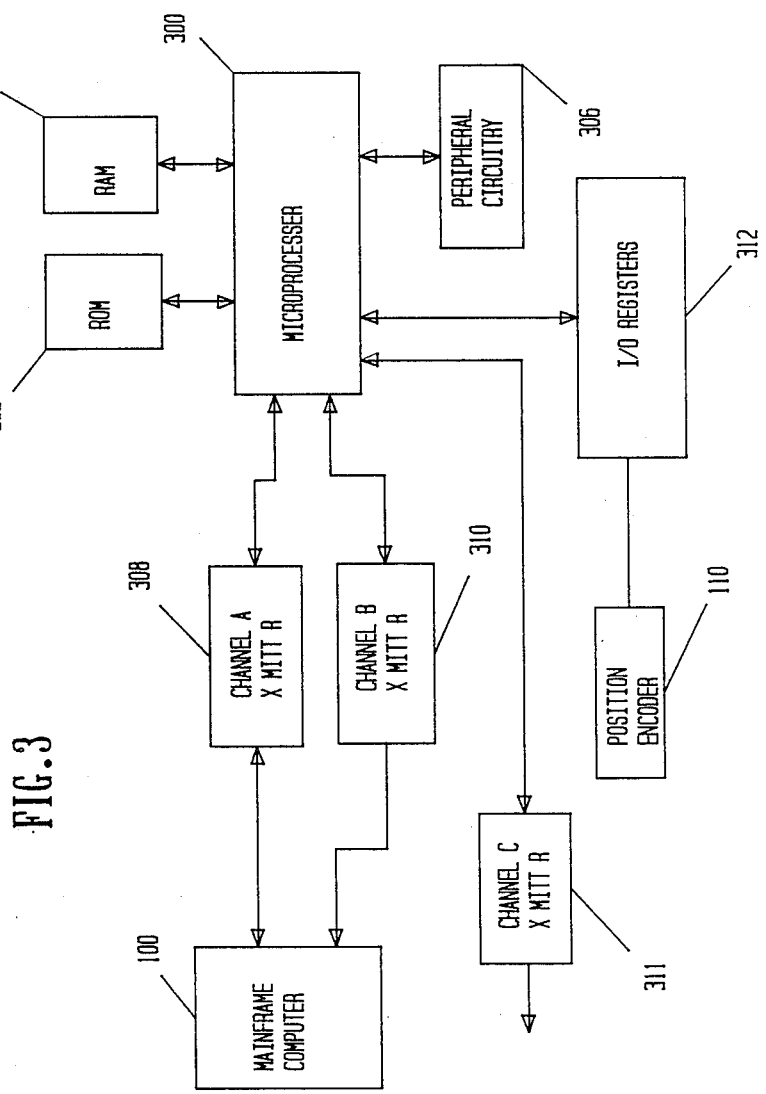
FIG. 3 is a more detailed illustrative block diagram of the interface processors illustrated in FIG. 1.

A more detailed block diagram of interface processor 104-1 is provided in FIG. 3. Each interface processor includes a microprocessor 300 for performing the necessary data processing of the interface processor. The microprocessor 300 is coupled to read only memory (ROM) 302, random access memory (RAM) 304 and peripheral circuitry 306. The peripheral circuitry includes oscillators, registers, latches, timing circuitry and other digital logic which is necessary to operate the microprocessor 300.

The random access memory 304 is provided for temporarily storing macro-commands and other control instructions from the mainframe computer 100. Further, the random access memory may be used for temporarily storing computation data generated when the microprocessor 300 is processing position data received from the position encoder 110. The random access memory 304 may also be used for temporarily storing computational data and error signals generated when performing the method illustrated in FIG. 2. Other uses for the random access memory 304 will readily become apparent to those skilled in the art.

As is known in the art, the read only memory 302 is used for storing program data which controls the operation of the microprocessor 300. The read only memory 302 is also used for storing the micro-commands which are generated by the interface processor in response to received macro-commands. In this regard, the micro-commands may be stored in the form of program data i.e., as sub programs, wherein each macro-command addresses a particular subprogram such that execution of the subprogram by the microprocessor 300 provides the plurality of microcommands. It should be apparent to those skilled in the art that use of the interface processor in this manner to generate the micro-commands to control the position of the object provides considerable freedom to the mainframe computer to perform other tasks, such as global control of a series of interface processors or other processing tasks.

The interface processor 104-1 further includes three transceivers 308, 310 and 311, for transmitting over channels A, B and C, respectively. The communication channel A transceiver 308 is provided for transmitting and receiving motion control signals between the mainframe computer 100 and the interface processor 104-1. The communication channel C transceiver 311 is provided for transmitting and receiving data from the interface processor to other interface processors. The communication channel B transceiver 310 is provided for transmitting position data from the interface processor to the mainframe computer. The communication channel C transceiver 311 is provided for transmitting and receiving data from the interface processor to other interface processors. The microprocessor 300 may be adapted to access the transceivers 308, 310 and 311 either directly or through an interface which may be part of the transceivers. Each channel transceiver may comprise an RS-232 port, including both hardware and software protocol for interfacing the microprocessor 300 with the mainframe computer 100 or other interface processors 104. Alternatively, the transceivers 308, 310 and 311 may comprise any digital communication link adaptable for implementation in the subject invention.

The microprocessor 300, the random access memory 304, the read only memory 302, the peripheral circuitry 306 and the channel transceivers 308, 110 and 311 may each be purchased as a single off the shelf microprocessor board as is known in the art. In the presently preferred embodiment, these devices are each part of a 68000 microprocessor control board model OB68K1A available from the Omnibyte Corporation. The program instructions (except those necessary to perform the method illustrated in FIG. 2) which are stored in read only memory 302 for operating the microprocessor 300 can be provided by those skilled in the art to perform the particular functions as described herein.

The interface processor 104-1 also includes input/output (I/O) registers 312. The registers are provided as additional storage in addition to the read only memory 302, the random access memory 304 and the registers contained within the peripheral circuitry 306. The I/O registers 312 are provided for temporarily storing position data received from the position encoder 110. The I/O registers may be either parallel or serial access, depending upon the nature of the position data received from the position encoders.

The I/O registers include means for indicating when data has been received from the position encoder 110.

The particular means relied upon may depend upon the particular application for which the positioning network is designed. In the presently preferred embodiment, the registers 312 are provided with flags (particular bits which are used as indicators) which are supplied to the microprocessor 300 as program interrupts. Also, the registers 312 may be provided with several storage locations which are adapted to store information until the register is polled by the microprocessor. These registers are used for position data which is not of high priority, e.g., first priority.

Figure 4:
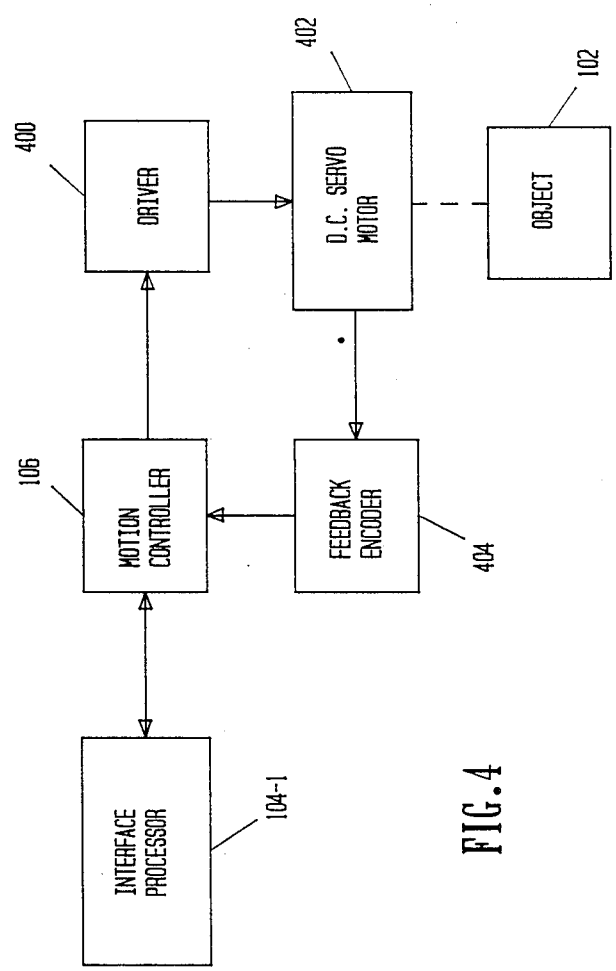
FIG. 4 is a more detailed illustrative block diagram of the servosystems illustrated in FIG. 1.

With reference to FIG. 4 a more detailed block diagram of the servosystems of FIG. 1 is provided. Each servosystem which is controlled by a motion controller 106 includes a driver 400 for amplifying the signal provided from the motion controller to apply a DC signal to a servomotor 402 for driving the servomotor. The servomoter 402 may be responsive to the magnitude of voltage and/or current applied to move the object 102. An increase in the magnitude of the applied DC signal may cause the servomotor to change the position of the object faster or slower. Of course, other methods of controlling the servomotor which may be used in the invention are known to those skilled in the art. For example, an increase in magnitude may cause the servomotor to change the absolute position of the object.

The change in position of the servomotor 402 is monitored by a feedback encoder 404 which supplies a feedback signal to the motion controller 106. The motion controller responds to the feedback signal to alter the motion of the servomotor such that it corresponds to the motion requested by the micro-command which the motion controller is executing. For example, the motion controller 106 may receive a micro-command which instructs it to rotate servomotor 402 at a particular speed. The motion controller will provide a signal to driver 400 such that a driving signal may be applied to the servomotor 402. The feedback encoder may be adapted to provide a signal which indicates each revolution of the servomotor 402. The motion controller 106 will divide the number of revolutions of the servomotor (as determined by the feedback signal) by the instantaneous elapsed time to provide a speed of the servomotor, which speed will be used to alter the signal provided to driver 400.

As illustrated by the foregoing example, the motion controller 106 is capable of performing simple mathematical calculations and data processing to execute micro-commands. However, the commands which the motion controller can execute are limited to movement at a particular speed, movement over a particular distance, rotation over a particular angle etc. Motion controllers for controlling servomotors in this manner can be purchased as off the shelf items. In the presently preferred embodiment, the motion controllers comprise model DMC/200 motion controllers available from the Galil Motion Control Company.

The servomotor 402 may comprise a plurality of readily available devices for providing rotary motion or linear motion. Many devices may be used for servomotor 402. As illustrative examples, although by no means a complete listing, the servomotor 402 may comprise an assembly for rotating a turntable, a motor for rotating a shaft, an assembly for linearly displacing a cart or an assembly for angularly displacing a pedestal. The feedback encoder, like the position encoder 110 may comprise a plurality of known transducers for indicating the motion of the servomotor.

While only several presently preferred embodiments of my novel object positioning apparatus and method have been described in detail herein, many modifications and variations may be made without departing from the true scope and spirit of the invention. It is my intent, therefore, to embody all such modifications and variations in the claims appended hereto.

1. A network for positioning an object, comprising:
a mainframe computer for providing macro-commands indicative of the desired movement of the object;
interface processing means for providing a plurality of micro-commands in response to each macro-command received from said mainframe computer;
servo means responsive to an applied signal for moving the object;
feedback encoder means responsive to the movement of said servo means for providing a feedback signal indicative thereof;
motion control means responsive to the micro-commands provided by said interface means for providing the applied signal to said servo means, said motion control means being further responsive to the feedback signal provided from said feedback encoder to vary the applied signal; and
position encoder means for providing position data indicative of the position of the object, said position encoder means being coupled to supply the position data to said interface processing means, said interface processing means being adapted to process the position data and supply the processed position data to said mainframe computer.

2. A position control network as recited in claim 1 wherein said interface processing means includes microprocessor means and first and second channel transceivers, said first channel transceivers being responsive to said microprocessor means for transmitting and receiving motion control data, including the macro-commands, to and from said mainframe computer and said second channel transceiver being responsive to said microprocessor means for transmitting the position data to said mainframe computer.

3. A position control network as recited in claim 2 wherein said first and second channel transceivers comprise RS232 communication ports.

4. A position control network as recited in claim 3 wherein said first and second channel transceivers comprise digital communication links.

5. A position control network as recited in claim 2 wherein said servo means comprises a plurality of servomotors each for providing motion to a particular axis of motion of the object and wherein said position encoder means comprises a plurality of position encoders each for providing position data indicative of the position of a particular axis of motion of the object, said interface processing means including a plurality of input/output registers associated with respective ones of the plurality of position encoders for temporarily storing the position data received from said position encoders before transmitting the position data to said mainframe computer.

6. A position control network as recited in claim 5 wherein said registers further include means for indicating receipt of position data, said microprocessor means being responsive to said indicating means for transmitting the position data to said mainframe computer.

7. A position control network as recited in claim 5 wherein said interface processing means further includes read only memory for storing program data for operating said microprocessor means, said read only memory also storing subprograms which are accessed by the macro-commands received from said mainframe computer, the stored subprograms for providing the plurality of micro-commands in response to each received macro-command.

8. A position control network as recited in claim 5 wherein said interface processing means further includes random access memory for temporarily storing data related to the position data received from said position encoders, and wherein said plurality of servomotors are adapted to move first and second objects, said plurality of position encoders being positioned to provide position data indicative of the position at the first and second objects, said microprocessor means being responsive to each received macro-command to provide a plurality of micro-commands for positioning the first object, said microprocessor means being further responsive to the position data for generating an error signal indicative of the difference in position between the first and second objects, the error signal being stored in said random access memory, said microprocessor means being responsive to the generated error signal to provide a plurality of micro-commands for positioning the second object such that the first and second objects undergo substantially synchronous movement.

9. A network for positioning an object in response to macro-commands received from a mainframe computer, said network comprising:
   interface processing means for providing a plurality of micro-commands in response to each macro-command, said interface processing means including a first transceiver for receiving said macro-commands from said mainframe computer;
   a plurality of motion means associated with said interface processing means, each said motion means being responsive to micro-commands provided by said interface processing means for moving the object; and
   encoding means for supplying position data indicative of the position of the object, said interface processing means being coupled to receive the position data, said interface processing means including a second transceiver for transmitting the position data to said mainframe computer.

10. A network as recited in claim 9 wherein each said motion means comprises:
   a servomotor responsive to an applied signal for moving the object;
   a motion controller for receiving the micro-commands and providing the applied signal to the servomotor in response to the micro-commands; and
   a feedback encoder for providing a feedback signal indicative of the motion of said servomotor, said motion controller being responsive to the feedback signal for altering the applied signal.

11. A position control network as recited in claim 9 wherein said interface processing means includes microprocessor means, said first transceiver being responsive to said microprocessor means for transmitting and receiving motion control data, including the macro-commands, to and from the mainframe computer and said second transceiver being responsive to said microprocessor means for transmitting the position data to the mainframe computer.

12. A position control network as recited in claim 11 wherein said first and second transceiver comprise RS-232 communication ports.

13. A position control network as recited in claim 11 wherein said motion means comprises a plurality of servomotors each for providing motion to a particular axis of motion of the object and wherein said encoding means comprises a plurality of position encoders each for providing position data indicative of the position of a particular axis of motion of the object, said interface processing means including a plurality of input/output registers associated with respective ones of the plurality of position encoders for temporarily storing the position data received from said position encoders before transmitting the position data to the mainframe computer.

14. A position control network as recited in claim 13 wherein said registers further include means for indicating receipt of position data, said microprocessor means being responsive to said indicating means for transmitting the position data to said mainframe computer.

15. A position control network as recited in claim 13 wherein said interface processing means further includes read only memory for storing program data for operating said microprocessor means, said read only memory also storing subprograms which are accessed by the macro-commands received from said mainframe computer, the stored subprograms for providing the plurality of micro-commands in response to each received macro-command.

16. A position control network as recited in claim 15 wherein said read only memory further comprises memory for storing subprograms for processing the position data.

17. A position control network as recited in claim 13 wherein said interface processing means further includes random access memory for temporarily storing data related to the position data received from said position encoders, and wherein said plurality of servomotors are adapted to move first and second objects, said plurality of position encoders being positioned to provide position data indicative of the position of the first and second objects, said microprocessor means being responsive to each received macro-command to provide a first plurality of micro-commands for positioning the first object, said microprocessor means being further responsive to the position data for generating an error signal indicative of the difference in position between the first and second objects the error signal being stored in said random access memory, said microprocessor means being responsive to the generated error signal to provide a plurality of micro-commands for positioning the second object such that the first and second objects undergo substantially synchronous movement.

18. A method for synchronous positioning of first and second objects wherein each object is moved by a respective motion control system under control of a mainframe computer, said method comprising the steps of:
   (a) transferring a macro-command from the mainframe computer to an interface processor associated with the motion control system of the first and second objects;
   (b) decoding each macro-command to provide a first plurality of micro-commands to the motion control system associated with the first object;
   (c) monitoring the position of the first and second objects to provide an error signal indicative of the difference in position between the first and second objects; and (d) providing a second plurality of microcommands to the motion control system associated with the second object, the second plurality of micro-commands being provided in response to the error signal such that the error signal is minimized and the first and second objects undergo substantially the same motion.

* * * * *